Feb. 27, 1951     J. R. PENROSE ET AL     2,543,668
ELECTRIC ARC WELDING APPARATUS
Filed May 21, 1949
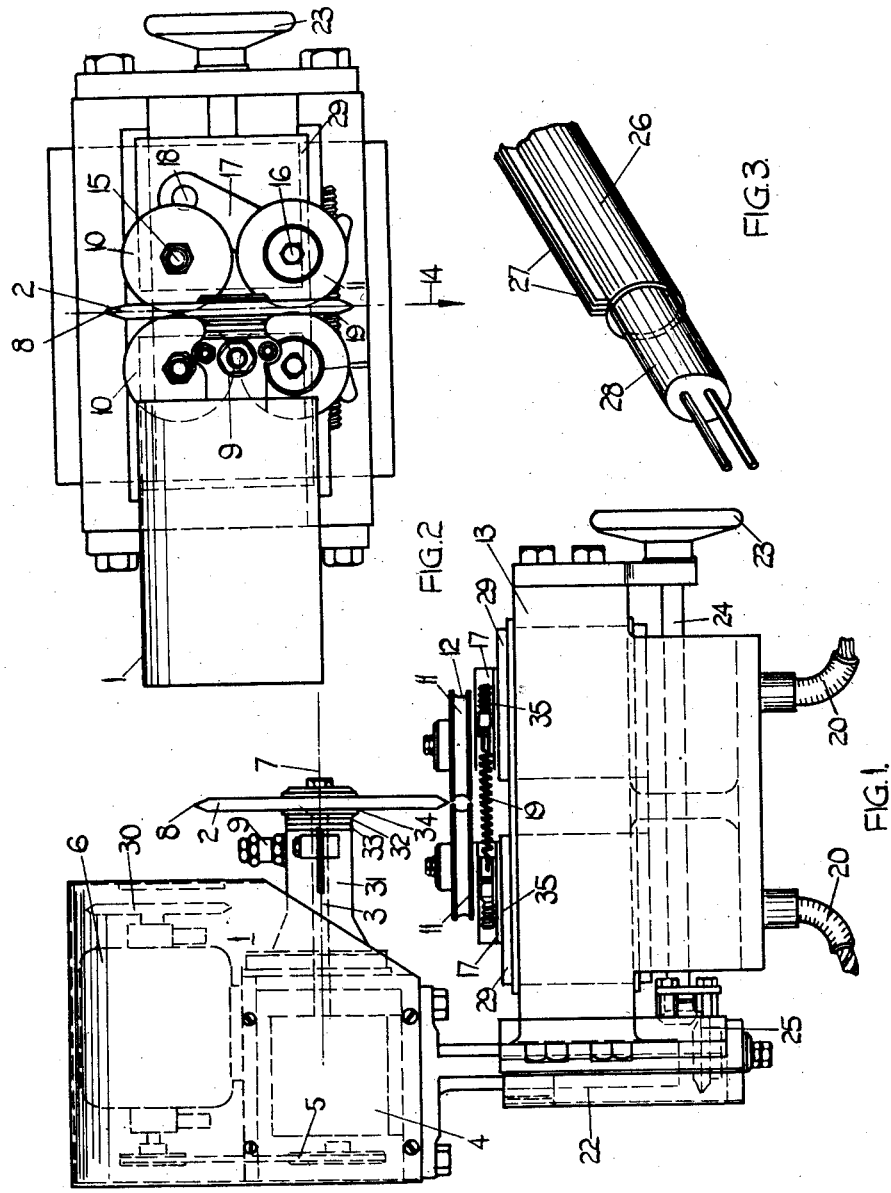
INVENTORS
JAMES RONALD PENROSE
JAMES ARTHUR DONELAN
BY
ATTORNEY Patented Feb. 27, 1951

2,543,668

UNITED STATES PATENT OFFICE 2,543,668

ELECTRIC ARC WELDING APPARATUS

James Ronald Penrose, Watford, and James Arthur Donelan, West Harrow, England, assignors to The General Electric Company Limited, London, England Application May 21, 1949, Serial No. 94,622
In Great Britain October 7, 1947

12 Claims. (Cl. 219—6)

1

This invention relates to processes for electric arc welding, and more particularly to processes for the continuous welding of long seams, and to apparatus therefor.

In arc welding processes using a fixed electrode, as an article to be welded is moved relative to the electrode, there is a tendency for the arc to be drawn in the direction in which the article is being moved and this makes it difficult to stabilise the arc with the result that an inefficient or unsatisfactory weld may be produced.

It is one object of the present invention to provide an arc welding process in which this tendency for the arc to move is eliminated or at least substantially reduced.

According to the present invention, in a process for electric arc seam-welding by relative movement of the seam and a welding head carrying a welding electrode, the said welding electrode having a curved surface for the root of a welding arc, the said surface is arranged, during welding, to move relative to the welding head in a direction substantially opposite to the movement of the seam relative to the head and at such a speed that the electric arc is held substantially in a given position relative to the welding head, the arc root on the welding electrode moving along the said curved surface.

The said electrode may consist of a disc, arranged so that the part of the periphery of the disc which constitutes the said curved surface of the electrode lies substantially parallel to the direction of relative movement of the seam, the said disc being arranged to be rotated about an axis through its centre. Preferably the disc is so mounted that it lies in a plane arranged to contain the said arc and is rotated at such a speed that the arc is held substantially to the shortest path between the electrodes and the seam.

One electric arc welding apparatus suitable for use in a process in accordance with the present invention for the manufacture of aluminium sheathed electric cables will now be described by way of example with reference to the two figures of the accompanying drawing in which Figures 1 and 2 show a side elevation and plan view respectively of the welding apparatus. Fig. 3 is a perspective view of a detail of the cable to be welded.

Referring now to Figures 1 and 2 of the drawing the welding head 1 of the arc welding apparatus comprises an electrode 2 in the form of a carbon disc carried on one end of a shaft 3 which is arranged to be driven through suitable ratio gearing 4 (shown diagrammatically in Figure 1) and a belt 5 by a D. C. electric motor 6. The disc

2

2 is thus arranged to be rotated about an axis 7 through its centre. The actual arcing edge is provided by the periphery 8 of the disc 2 which is tapered.

The shaft 3 is supported in a bracket 31 which is insulated from the gearing 4 and the rest of the housing 1. An input terminal 9 is provided on the bracket 31 and a copper-graphite disc 32 is located between the collar 33 of a brass sleeve set into the bracket 31 and one of two brass discs 34 between which the disc 2 is clamped, the copper-graphite disc 32 being free to rotate on the shaft 3. The shaft 3 is, in fact, connected to the gearing 4 through a flexible insulated coupling (not shown) and is spring-loaded to force the disc 2 towards the bracket 31 so that a good electrical connection between the electrode disc 2 and the terminal 9 is provided through the copper-graphite disc 32. To prevent the motor 6 overheating it is provided with a fan 30 which draws relatively cool air through the motor.

The aluminium sheathed cable to be welded is arranged to be fed in the direction of the arrow 14 in Figure 2 between two pairs of guide wheels 10 and 11 mounted on two parts 29 of a base 13, the wheels 10 and 11 being freely rotatable. The periphery of each wheel 10 and 11 has a concave groove 12 and the wheels are mounted so as to lie in a plane at right angles to the plane containing the periphery 8 of the disc 2 and the two wheels 10 or 11 of each pair are disposed one on each side of the cable, so that the seam to be welded lies in the plane containing the disc periphery 8 and the point on the cable sheath closest to the edge of the disc 2 is between the two pairs of guide pulleys 10 and 11. It will be appreciated that it is over this shortest distance that it is desired to maintain the arc during operation of the apparatus.

One of each pair of guide wheels 10 and 11 is mounted on each part 29 of the base 13. The shafts 15 about which the trailing pair of guide wheels 10 rotate are securely fixed to the parts 29 and are each provided with an oil impregnated bearing (not shown) so that the guide wheels 10 are electrically connected to the base 13, although no part of the welding current flows through the guide wheels 10. The shafts 16 of the leading pair of guide wheels 11 are each provided with a copper-graphite washer (not shown) against which the wheel 11 is spring-loaded and are mounted on an arm 17 which is pivotted on a shaft 18 passing through the part 29 and the shaft 18 which is insulated from the part 29 by an insulating bush 35 is connected to a cable 20, the two cables 20 being parallel-connected to the source of welding current. The two wheels 11 are drawn together by a spring 19 held in tension between the ends of the two arms 17 and there is thus arranged to be equal contact pressure between the two wheels 11 which act as current collectors and the cable sheath. The two parts 29 are arranged to be moved in directions at right angles to the direction of cable feed so that the guide wheels 10 and 11 may be adjusted to correctly locate the seam to be welded under the disc 2.

The welding head 1 is securely fixed to a slide which fits into a part 22 at the rear of the base 13. A screw-jack (not shown) is provided within the part 22 so that the head 1 may be raised or lowered to adjust the length of the welding arc, the jack being operated by a hand-wheel 23 through a shaft 24 and bevel gears 25.

As previously stated the welding apparatus described above is intended primarily for welding the outer aluminium sheath of an electric cable, strip aluminium being first formed round the cable leaving a longitudinal seam as shown in Figure 3. The sheath 26 is formed so that the edges 27 are bent away from the cable 28 to provide two adjacent projecting lips which are to be welded together and the two lips are then subjected to a preliminary weld by a cold pressure welding process. To avoid any difficulty due to trapped air within the sheath when it is arc welded, there should be as short a length of cable as possible between the arc welding apparatus and the pressure welding rolls and, in a continuous process, the cable may pass successively through sheath forming rolls, pressure welding rolls and the arc welding apparatus, only the pressure welding rolls being driven to feed the cable therethrough and the cable passing on to a take-up drum after leaving the arc welding apparatus.

The input terminal 9 and the cables 20 are connected, preferably, to the negative and positive sides respectively of a direct current source of welding current and in operation of the arc welding apparatus, the sheathed cable is first fed between the guide wheels 10 and 11 and the two parts 29 are adjusted and clamped in position by means of lock-nuts (not shown in the drawing) so that the cable sheath 26 is firmly gripped between the guide wheels 10. The arc is then struck between the cable sheath 26 and the electrode 2, for example by momentarily applying a high frequency voltage between the terminal 9 and the cables 20. As the sheathed cable 28 is fed at a constant speed between the guide wheels 10 and 11 and under the carbon disc electrode 2, the disc 2 is rotated by the electric motor 6 so that the part of the periphery 8 of the disc 2 which is carrying the root of the welding arc is moving in the opposite direction to the cable sheath 26 and the speed of the disc 2 is adjusted to a value at which the arc is substantially held to the shortest path between the electrode 2 and the cable sheath 26.

The depth of penetration of the weld is dependent on the magnitude of the welding current and the speed of the cable 26 and these variables may be adjusted to give complete penetration. The necessary additional metal required for the arc weld is provided by the projecting lips and if good penetration is obtained in the weld, the resulting bead may be subsequently removed.

During trial runs it has been found that the arc is held in the desired position if the carbon disc is rotated so that the linear speed of the edge of the disc is between $\frac{1}{10}$ and $\frac{1}{15}$ of the speed of the cable, for cable speed of 25 ft. per minute and a welding current of approximately 180 amps. The carbon disc is found to burn away at a comparatively slow rate of the order of a few thousandths of an inch in radius per hundred yards of cable welded and the length of the welding arc may be periodically adjusted by turning the hand-wheel 23.

Stabilising means may be provided to overcome any tendency for the arc to drift from the desired position. For example magnetic means may be used comprising a pair of U-shaped electromagnets having windings energised by direct current. The two electromagnets are disposed so as to produce a magnetic flux at right angles to the line of the cable, one electromagnet being ahead of and one behind the welding arc, opposing poles of the two electromagnets being of like polarity. In addition, in order to improve arc stability and protect the material being welded from the effects of the atmosphere, a jet of argon may be directed on to the arc in the direction of travel of the cable.

Alternatively gas stabilising may be used either by providing a curtain of suitable gas, such as nitrogen, ahead of and behind the arc or by directing two jets of argon, one from each side of the arc, on to the spot where the arc is wanted.

Although in the process described above the carbon disc electrode 2 is negative with respect to the work piece, this polarity may be reversed or the welding current may be alternating.

The apparatus described above with reference to Figures 1 and 2 may also be used for manufacturing tubes and in that case, it has been found that the preliminary pressure weld is not then essential but is desirable if direct welding current is being used.

Instead of the disc electrode 2 being of carbon, when welding aluminium, it may alternatively be of tungsten or molybdenum.

It will be appreciated that the invention is not restricted to the welding of aluminium; for example steel may be welded in a similar manner to that described above and in that case, a disc electrode of tungsten could be used. Moreover, by using two rotating discs, the invention may be applied to electric arc welding processes using two-phase alternating current or alternatively an arc may be maintained between the two discs by connecting a single phase supply across them.

We claim:

1. A process for electric arc seam welding by relative movement of the seam and a welding head carrying a welding electrode, the said welding electrode having a curved surface for the root of the welding arc, wherein the said surface is arranged, during welding, to move relatively to the welding head in a direction substantially opposite to the movement of the seam relative to the head and at such a speed that the electric arc is held substantially in a given position relative to the welding head, the arc root on the welding electrode moving along the said curved surface.

2. A process as claimed in claim 1, wherein the said welding electrode is a disc arranged to rotate about an axis through its centre, the periphery of the disc providing the said curved surface.

3. Electric arc seam welding apparatus comprising a welding head, a welding electrode carried by said welding head and having a curved surface for the root of the welding arc, means for moving the material to be welded relatively to the welding head, and means for moving the curved surface of the welding electrode relatively to the welding head in a direction substantially opposite to the direction of movement of the material relatively thereto.

4. Electric arc seam welding apparatus comprising a welding head, a welding electrode carried by said welding head and having a curved surface for the root of the welding arc, means for moving the material to be welded relatively to the welding head, and means for moving the curved surface of the welding electrode relatively to the welding head in a direction substantially opposite to the direction of movement of the material relatively thereto, and at a fraction of the speed thereof.

5. Electric arc seam welding apparatus comprising a welding head, a disc-form welding electrode mounted for rotation about its axis of symmetry and carried by said welding head, means for moving the material to be welded relatively to the welding head in proximity to a part of the periphery of the welding electrode, and means for rotating the welding electrode about said axis so that said material and said part of the periphery of the welding electrode adjacent thereto move in opposite directions relatively to the welding head.

6. Electric arc seam welding apparatus comprising a welding head, a disc-form welding electrode mounted for rotation about its axis of symmetry and carried by said welding head, means for moving the material to be welded relatively to the welding head in proximity to a part of the periphery of the welding electrode, and means for rotating the welding electrode about said axis so that said material and said part of the periphery of the welding electrode adjacent thereto move in opposite directions relatively to the welding head at a fraction of the speed of movement of the material to be welded.

7. Electric arc seam welding apparatus for welding a longitudinal seam in a metal tube comprising a stationary welding head, a disc-form welding electrode mounted for rotation about its axis of symmetry and carried by said welding head, guide wheels for feeding the tube to be welded in proximity to a part of the periphery of the welding electrode and substantially in the plane thereof, and means for rotating the welding electrode about its axis to cause the part of the periphery of the welding electrode adjacent to the tube to move in a direction opposite to the direction of feed of the tube at a fraction of the speed of feed.

8. Apparatus according to claim 7 wherein the tube passes between two pairs of guide wheels, the welding electrode being disposed between said two pairs of guide wheels.

9. Apparatus according to claim 8, wherein at least one pair of said guide wheels act as current collectors.

10. Electric arc seam welding apparatus for welding a longitudinal seam comprising a stationary welding head, a disc-form welding electrode mounted for rotation about its axis of symmetry and carried by said welding head, a pair of guide wheels for feeding the material to be welded in proximity to a part of the periphery of the welding electrode, connections for feeding electric current to said guide wheels, spring-biased means for urging said pair of guide wheels towards one another into contact with the material to be welded, a second pair of guide wheels for the material to be welded, an insulating mounting for said second pair of guide wheels, and means for rotating the welding electrode about said axis of symmetry to cause the part of the periphery of the welding electrode adjacent to the material to be welded to move in a direction opposite to the direction of feed of the material at a fraction of the speed of feed of said material.

11. Electric arc seam welding apparatus comprising a welding head, a disc-form welding electrode made of carbon mounted for rotation about its axis of symmetry and carried by said welding head, means for moving the material to be welded relatively to the welding head in proximity to a part of the periphery of the welding electrode, and means for rotating the welding electrode about said axis so that said material and said part of the periphery of the welding electrode adjacent thereto move in opposite directions relatively to the welding head at a fraction of the speed of movement of the material to be welded.

12. Electric arc seam welding apparatus for welding a longitudinal seam in a metal tube comprising a stationary welding head, a disc-form welding electrode made of carbon mounted for rotation abount its axis of symmetry and carried by said welding head, guide wheels for feeding the tube to be welded in proximity to a part of the periphery of the welding electrode and substantially in the plane thereof, and means for rotating the welding electrode about its axis to cause the part of the periphery of the welding electrode adjacent to the tube to move in a direction opposite to the direction of feed of the tube at a fraction of the speed of feed.

JAMES RONALD PENROSE.
JAMES ARTHUR DONELAN.

REFERENCES CITED

The following references are of record in the file of this patent:

UNITED STATES PATENTS

| Number | Name | Date |
|---|---|---|
| Re. 20,035 | Strobel | July 14, 1936 |
| 1,217,431 | Foley | Feb. 27, 1917 |
| 1,287,774 | Sessions | Dec. 17, 1918 |
| 1,298,590 | Smith | Mar. 25, 1919 |
| 1,415,848 | White | May 9, 1922 |
| 1,493,529 | Greene | May 13, 1924 |
| 1,570,452 | Sjobring et al. | Jan. 19, 1926 |
| 1,580,020 | Cutler et al. | Apr. 6, 1926 |
| 2,330,503 | Longoria | Sept. 28, 1943 |

FOREIGN PATENTS

| Number | Country | Date |
|---|---|---|
| 246,565 | Great Britain | Jan. 28, 1926 |